United States Patent
Dekett et al.

(10) Patent No.: US 9,489,860 B2
(45) Date of Patent: Nov. 8, 2016

(54) SYSTEMS AND METHODS FOR MUSIC INSTRUCTION

(71) Applicant: Mastermind Design Ltd., Hatboro, PA (US)

(72) Inventors: Robert Steven Dekett, Hatboro, PA (US); James R Stelzer, Marathon, FL (US)

(73) Assignee: Mastermind Design Ltd., Hatboro, PA (US)

( * ) Notice: Subject to any disclaimer, the term of this patent is extended or adjusted under 35 U.S.C. 154(b) by 0 days.

(21) Appl. No.: 15/068,498

(22) Filed: Mar. 11, 2016

(65) Prior Publication Data
US 2016/0267805 A1    Sep. 15, 2016

Related U.S. Application Data

(60) Provisional application No. 62/133,299, filed on Mar. 14, 2015.

(51) Int. Cl.
G09B 15/00    (2006.01)
G09B 5/06    (2006.01)

(52) U.S. Cl.
CPC ............... *G09B 15/00* (2013.01); *G09B 5/065* (2013.01); *G10H 2210/385* (2013.01)

(58) Field of Classification Search
CPC . G09B 15/00; G09B 5/065; G10H 2210/385
See application file for complete search history.

(56) References Cited

U.S. PATENT DOCUMENTS

| | | | | |
|---|---|---|---|---|
| 5,690,496 A * | 11/1997 | Kennedy | ............... | G09B 15/04 345/473 |
| 8,338,684 B2 * | 12/2012 | Pillhofer | ............... | G09B 15/00 84/470 R |
| 8,481,839 B2 * | 7/2013 | Shaffer | ............... | G09B 15/00 84/609 |
| 8,847,053 B2 * | 9/2014 | Humphrey | ............ | G09B 5/065 434/308 |
| 9,269,341 B1 * | 2/2016 | Lemnitsky | ............... | G10H 1/40 |
| 2006/0134590 A1 * | 6/2006 | Huffman | ................. | G09B 5/06 434/307 A |
| 2008/0295672 A1 * | 12/2008 | Compton | ............. | G09B 15/009 84/605 |
| 2011/0003638 A1 * | 1/2011 | Lee | ........................ | G09B 15/00 463/35 |
| 2016/0172000 A1 * | 6/2016 | Ju | ......................... | H04N 5/772 386/241 |

OTHER PUBLICATIONS

VideoSurgeon—downloaded on Jun. 8, 2016 from http://videosurgeon.net/.
Transcribe!—downloaded on Jun. 8, 2016 from http://www.seventhstring.com/xscribe/overview.html.

\* cited by examiner

*Primary Examiner* — Robert W Horn

(57) ABSTRACT

Disclosed are systems and methods for instructing a musician to play an instrument. Methods can include importing a video file into a directory of a remote computing device. The video file can include video of a second musician playing the instrument and audio of the second musician playing the instrument. Methods can include playing the video file with the remote computing device, and decreasing a tempo of the video. The audio can continue to remain in pitch while the tempo of the video has been decreased.

20 Claims, 9 Drawing Sheets

SYSTEMS AND METHODS FOR MUSIC INSTRUCTION

CROSS-REFERENCE TO RELATED APPLICATIONS

This application claims the benefit of U.S. Provisional Patent Application No. 62/133,299; filed Mar. 14, 2015; and entitled SYSTEMS AND METHODS FOR INSTRUCTING A MUSICIAN. The entire contents of U.S. Provisional Patent Application No. 62/133,299 are incorporated herein by reference.

BACKGROUND

1. Field of Invention

The present invention relates to educational software and in some embodiments to a computer-implemented system and method for assisting a user in learning a musical sequence.

2. Description of Related Art

In order to learn a particular musical sequence (e.g. a riff), from a media file (audio file) or a multimedia file (video with synchronized sound), a musician usually slows down the tempo to learn the sequence. However, when the tempo of any media or multimedia file is altered, the pitch of the audio can also be adversely affected, which can confuse the musician. Therefore, there is a need in the art for a solution that compensates for the audio pitch as the tempo of the media or multimedia file is altered.

SUMMARY

The present disclosure describes a method of instructing a first musician to play an instrument. The method can include importing a video file into a directory of a remote computing device, wherein the video file comprises video of a second musician playing the instrument and audio of the second musician playing the instrument. As well, the method can include playing the video file with the remote computing device and decreasing a tempo of the video, wherein while the tempo of the video has been decreased, the audio continues to remain in pitch. In some embodiments, the instrument is one of a stringed instrument, a brass instrument, a reed instrument, a keyboard instrument, and a percussion instrument.

Methods can include increasing the tempo of the video, wherein while the tempo of the video has been increased, the audio continues to remain in pitch. Methods can include zooming and panning into a selected area of the video, and wherein the selected area is the second musician playing the instrument. Accordingly, methods can include zooming away from the selected area of the video.

In some embodiments, the method can include creating a loop of a selected portion of the video and audio. Methods can also include zooming into a portion of video of the loop and performing at least one of increasing and decreasing a tempo of the portion of the video of the loop.

Some methods can include replaying the loop. The loop can be a first loop, and methods can further include creating a second loop of a second selected portion of the video and audio. Accordingly, methods can include zooming into a portion of video of the second loop and performing at least one of increasing and decreasing a tempo of the portion of the video of the second loop.

Methods can also include creating a third loop of a third selected portion of the video and audio, creating a fourth loop of a fourth selected portion of the video and audio, creating a fifth loop of a fifth selected portion of the video and audio, and creating a sixth loop of a sixth selected portion of the video and audio. Methods can also include displaying, via a screen of the remote computing device, at least one loop in a timeline that indicates song duration. It should be appreciated that song duration is the time length of a song.

This disclosure also includes a stompbox system that includes a remote computing device and a stompbox device communicatively coupled to the remote computing device. The stompbox device can include an outer housing, a first button coupled to the housing, and a second button coupled to the outer housing. In response to the first button being pressed, the remote computing device can be configured to play a video file comprising video of a musician playing an instrument and audio of the musician playing the instrument. In response to the second button being pressed, the remote computing device can be configured to decrease a tempo of the video such that while the tempo of the video has been decreased, the audio continues to remain in pitch. In some embodiments, in response to the second button being pressed for a duration of time, the remote computing device can be configured to increase the tempo of the video such that while the tempo of the video has been increased, the audio continues to remain in pitch.

In some embodiments, the stompbox device can further include a third button coupled to the outer housing and a fourth button coupled to the outer housing. In response to the third button being pressed, the remote computing device can be configured to start a loop of a selected portion of the video and audio. In response to the fourth button being pressed, the remote computing device can be configured to end a loop of the selected portion of the video and audio.

As well, in some embodiments, the stompbox device can further include a fifth button coupled to the outer housing. In response to the fifth button being pressed for a first duration of time, the remote computing device can be configured to move from a first loop to a second loop. In response to the fifth button being pressed for a second duration of time, the remote computing device can be configured to clear the first loop.

Even still, in some embodiments, the stompbox device can further include a sixth button coupled to the outer housing. In response to the sixth button being pressed for a first duration of time, the remote computing device can be configured to zoom into a selected area of the video. The selected area can be the musician playing the instrument. In response to the sixth button being pressed for a second duration of time, the remote computing device can be configured to zoom away from the selected area of the video.

Embodiments of the stompbox can further include a seventh button coupled to the outer housing and an eighth button coupled to the outer housing. In response to the seventh button being pressed, the remote computing device can be configured to fast forward the video file. In response to the eighth button being pressed, the remote computing device can be configured to fast rewind the video file.

The disclosure also includes a stompbox device that includes an outer housing, a first button coupled to the outer housing, and a second button coupled to the outer housing. In response to the first button being pressed, a remote computing device can be configured to play a video file comprising video of a musician playing an instrument and audio of the musician playing the instrument. In response to the second button being pressed, the remote computing device can be configured to decrease a tempo of the video such that while the tempo of the video has been decreased, the audio continues to remain in pitch.

In some embodiments, the device further includes a third button coupled to the outer housing and a fourth button coupled to outer housing. In response to the third button being pressed, the remote computing device can be configured to start a loop of a selected portion of the video and audio. In response to the fourth button being pressed, the remote computing device can be configured to end a loop of the selected portion of the video and audio.

As well, in some embodiments, the device can further include a fifth button coupled to the outer housing, a sixth button coupled to the outer housing, a seventh button coupled to the outer housing, and an eighth button coupled to the outer housing. In response to the fifth button being pressed, the remote computing device can be configured to move from a first loop to a second loop. In response to the sixth button being pressed, the remote computing device can be configured to zoom into a selected area of the video. In response to the seventh button being pressed, the remote computing device can be configured to fast forward the video file. In response to the eighth button being pressed, the remote computing device can be configured to fast rewind the video file.

The stompbox can define a first row and a second row. The first row can include the first button, second button, fifth button, and sixth button. The second row can include the third button, fourth button, seventh button, and eighth button. In some embodiments, the fifth button and the sixth button are both located between the first button and the second button, and the third button and the seventh button are both located between the fourth button and the eighth button.

Other objects and advantages of the embodiments herein will become readily apparent from the following detailed description taken in conjunction with the accompanying drawings.

The embodiments described above include many optional features and aspects. Features and aspects of the embodiments can be combined.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
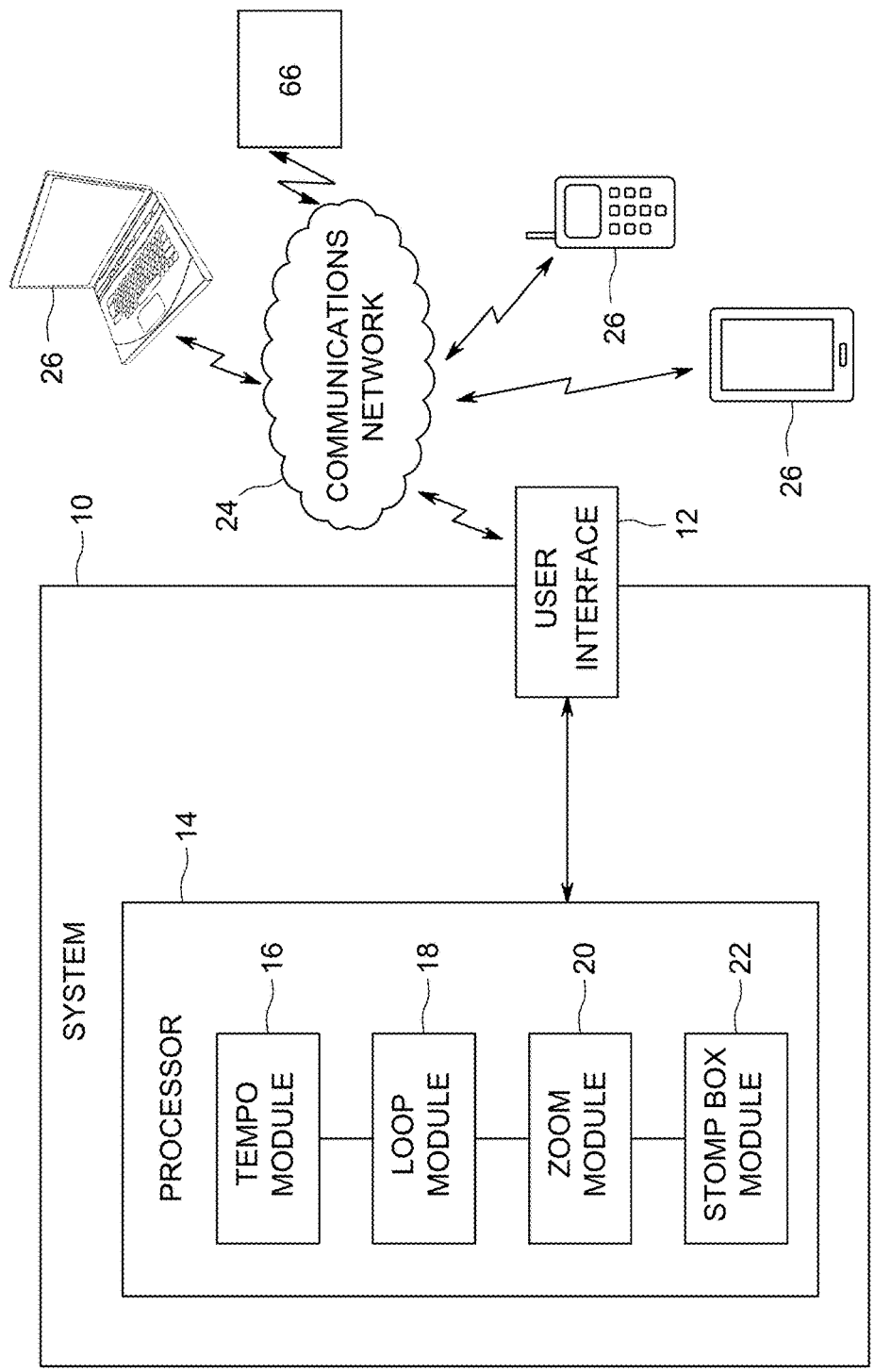
FIG. 1 illustrates a block diagram of the system, according to an embodiment of the present invention.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Additionally, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

REFERENCE NUMERALS

10—System
12—User interface
14—Processor
16—Tempo module
18—Loop module
20—Zoom module
22—Stompbox module
24—Communications networks
26—Remote computing device
28—"Open" button
30—"YouTube®" button
32—URL field
34—"Close" button
36—Progress bar
38—Marker
40—"Start" loop indicator
42—"End" loop indicator
44—"Start" loop button 46—"End" loop button
48—"Loop" open button
50—"Loop now" button
52—"Clear loop" button
54—"Clear all" button
56—"Undo" button
58—Loop
60—"Enable loop" checkbox
62—Tempo slider
63—Pitch control slider
64—Zoom slider
65—Itemize loop area
66—Stompbox device
68—First step
70—Second step
72—First button
74—Second button
76—Third button
78—Fourth button
80—Fifth button
82—Sixth button
84—Seventh button
86—Eighth button
88—Input field
90—Function
100—Select a video file step
102—Select pitch shift step
104—Adjust tempo step
106—Keep the audio in pitch step
108—Define a start loop point step
110—Define an end loop point step
111—Display loop in timeline step
112—Save a loop step Introduction In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense. Accordingly, while the description may illustrate embodiments related to music education, it should be appreciated that this disclosure can broadly be applied in many other applications, such as, but not limited to sports motion and technique analysis, which can include analysis of swinging a golf club, swinging a baseball bat, throwing a ball (e.g. a baseball), swinging a table tennis paddle, serving a ping pong ball with a table tennis paddle, swinging a tennis racket, serving a tennis ball with a tennis racket, passing and shooting a hockey puck with a hockey stick, shooting a basketball, passing and shooting a soccer ball, swimming, running, performing martial arts, cycling, dancing, and the like. As such, the disclosure can be implemented as a teaching tool, a learning tool, and the like across any activity that involves motion that can be analyzed.

Embodiments of the present invention are directed to a computer-implemented system for assisting a first musician in learning to play a musical sequence with a musical instrument. The musical sequence can be a full song, a portion of a song, a riff, a solo, and the like. As well, the musical instrument can be any instrument configured to produce musical sounds. In some embodiments the musical instrument is one of a stringed instrument, a brass instrument, a reed instrument, a keyboard instrument, and a percussion instrument. String instruments can comprise one or more of a banjo, bass, bass guitar, cello, guitar, harp, mandolin, pedal steel guitar, sitar, ukulele, viola, violin, and the like. Brass instruments can comprise one or more of a French horn, trombone, trumpet, tuba, flute, piccolo, and the like. Reed instruments can comprise one or more of a bassoon, clarinet, oboe, saxophone, and the like. Keyboard instruments can comprise one or more of a harpsichord, keyboard, electronic keyboard, organ, piano, clavinet, synthesizer, and the like. Percussion instruments can comprise one or more of a bass drum, celesta, chime, cymbal, drum, glockenspiel, marimba, snare drum, tambourine, timpani, triangle, vibraphone (vibes), xylophone, and the like.

Furthermore, the musical sequence can be included on a video played on a multimedia or video file comprising synchronized audio and video tracks. As well, the musical sequence can include an image and audio of a second musician playing an instrument. The video file can be of any format known in the art, such as MP4, MKV, AVI, M4V, etc. More particularly, the system can be adapted to process a video file in such a way that learning by the first musician can be facilitated. The system may also be employed for processing audio files the same way video files are processed.

System Embodiments

With reference to FIG. 1, the system 10 comprises a user interface 12 for enabling a user (i.e., the first musician) to interact therewith, and a processor 14, which comprises a set of computer instructions wherein, the processor 14 and the user interface 12 are disposed in operative communication with one another. The processor 14 can be divided into a plurality of processing modules including a tempo module 16, a loop module 18, a zoom module 20, and a stompbox module 22. The utility of each of which will become apparent from the following body of text.

The first musician via the user interface 12 can access the system 10 over a communications network 24, such as, the Internet. The user interface 12 can be facilitated by a plurality of remote user terminals 26, which may include a remote computing device 26 (e.g. a desktop computer, a laptop computer, a tablet, a smartphone, and the like). For the system 10 to be accessed, the system 10, which can be a computer application, can be initially installed within the remote computing device 26.

Figure 2:
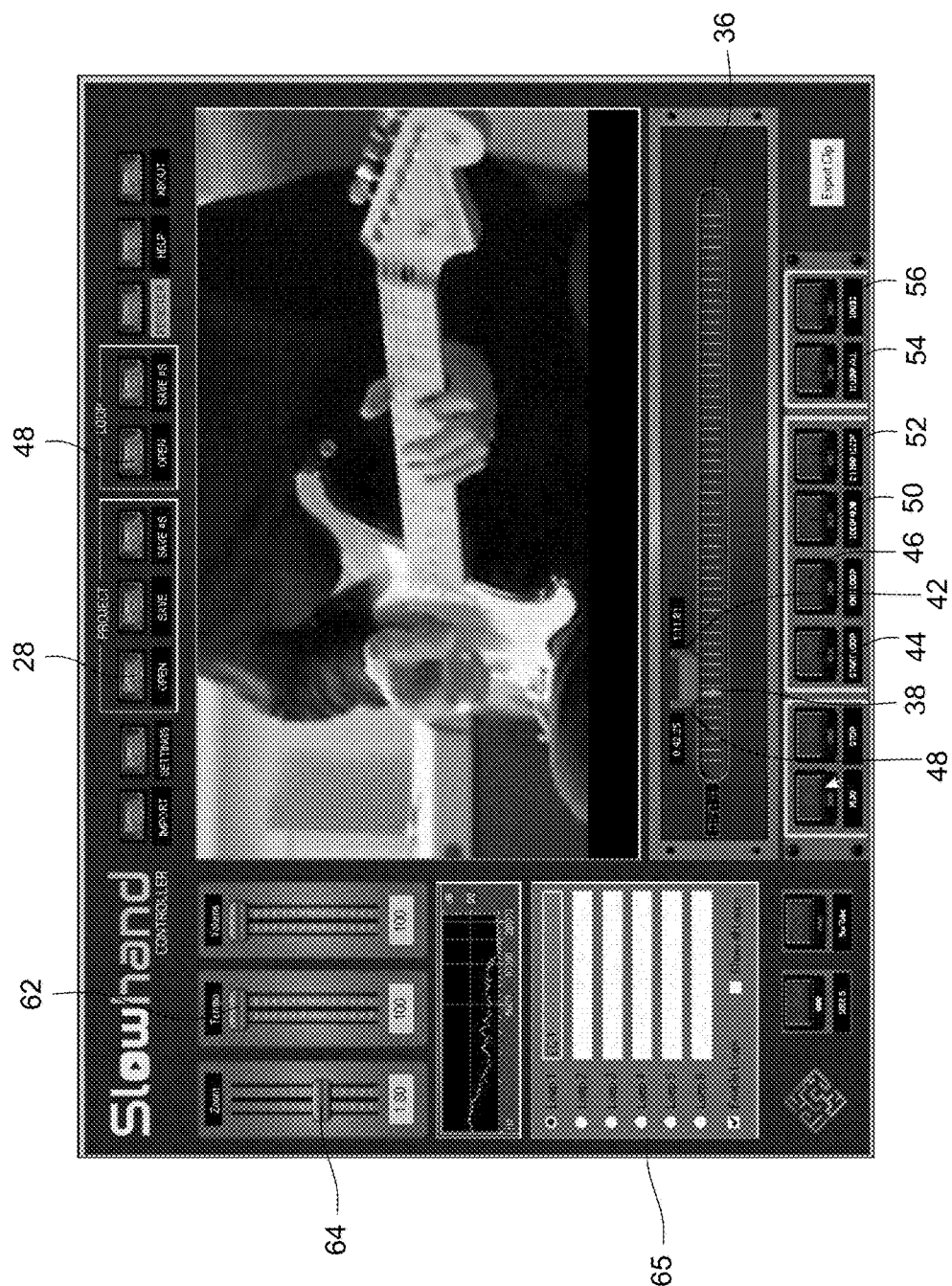
FIG. 2 illustrates functions pertaining to the loop module, tempo module and the zoom module, according to an embodiment of the present invention.
Figure 3:
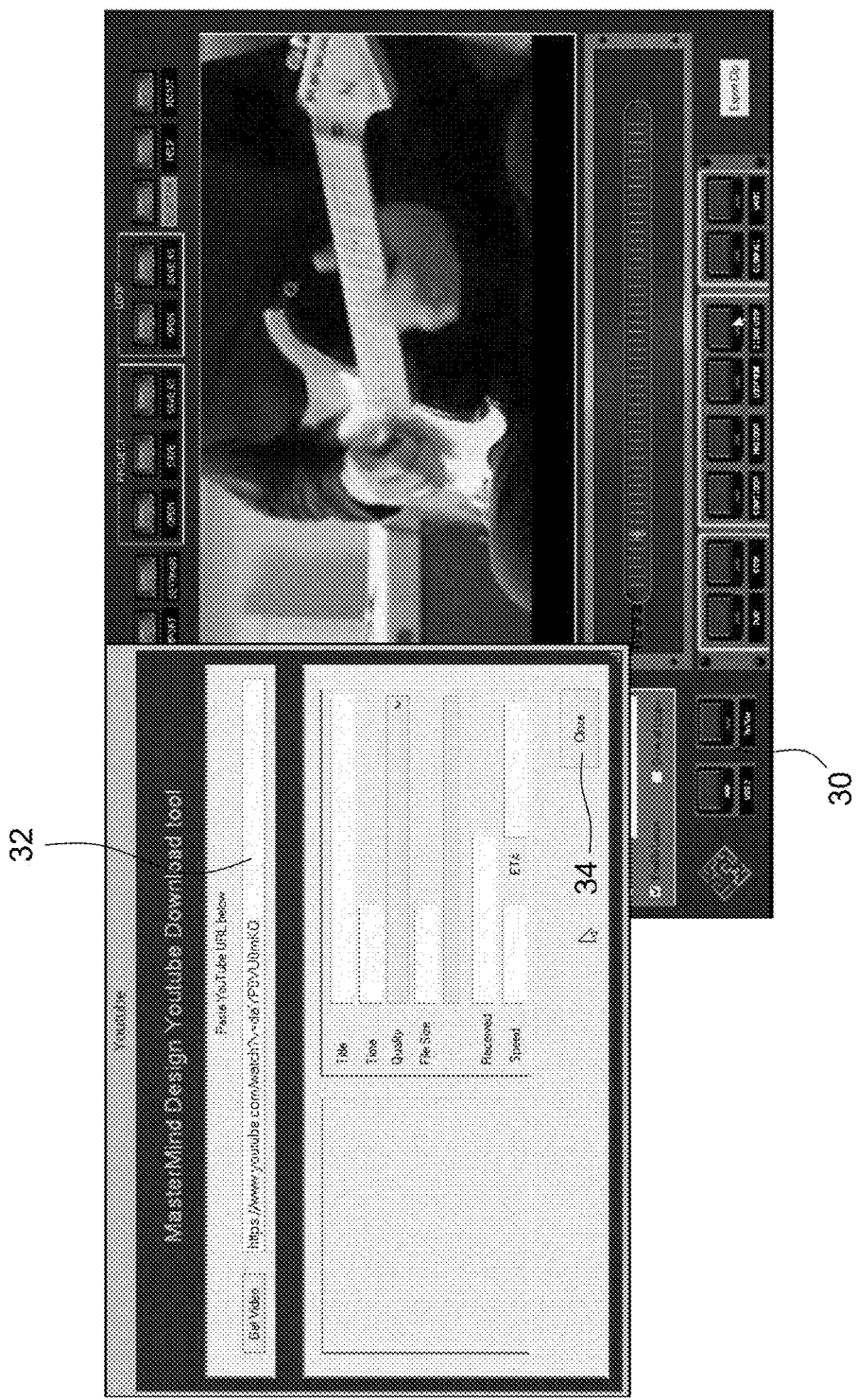
FIG. 3 illustrates a pop-up window prompting to input the URL of a video on a video hosting website, according to an embodiment of the present invention.

Referring now to FIGS. 1 through 3, the system 10 can be implemented via the remote computing device 26, and other devices, such as a stompbox device 66, which will be described later. In some embodiments, the user may load a video file on to the remote computing device 26 through any suitable process, such as importing the video file from an external source, like YouTube®. Once the user has downloaded the video file to the remote computing device 26, the user can then open the video file within the system 10. Specifically, in order to process the video file, the video file can be initially selected from a local storage or database within the remote computing device 26 via the user interface 12. As can be appreciated from the illustration in FIG. 2, by selecting the 'open' button 28 under projects, the first musician can be prompted to select the video file from the directory of the local database.

As well, the first musician may import (e.g. download) the video file(s) from a video hosting website such as YouTube®, Vimeo®, etc. This can be performed by selecting a "YouTube" button 30 (in the event of the video hosting website being YouTube®) via the user interface 12. The selection results in an input URL field 32 being opened. The first musician can be prompted to enter the URL of the video. Upon confirming the URL (by selecting a 'Close' button 34), the corresponding video file can be downloaded and saved to a local database of the remote computing device 26, while concurrently, the system 10 can initiate processing of the selected video file.

Figure 4:
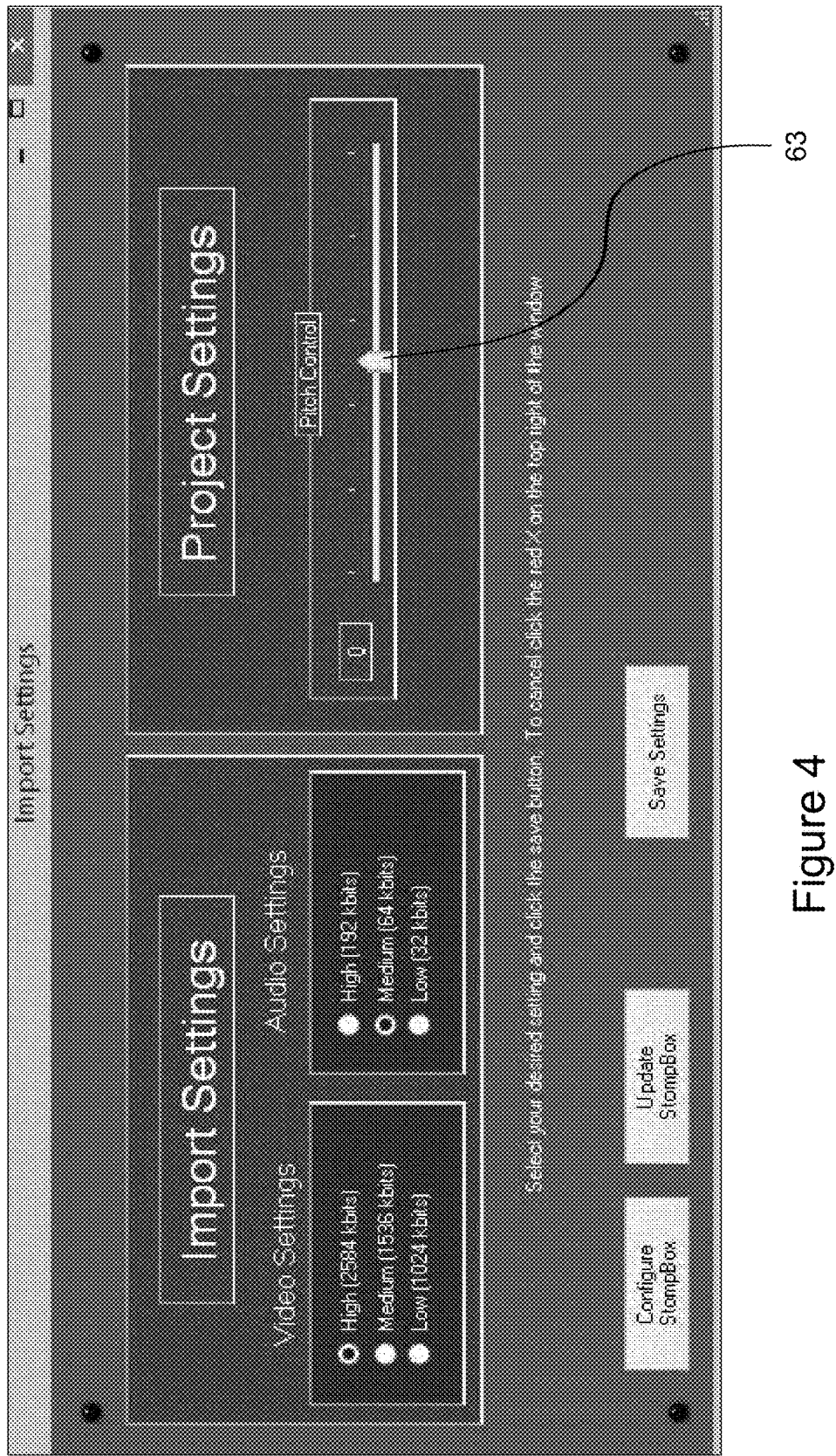
FIG. 4 illustrates the import settings including quality settings and pitch settings, according to an embodiment of the present invention.

In some embodiments, as can be appreciated from FIG. 4, the first musician can be enabled to choose the quality of the audio and video tracks of the video being downloaded from a video hosting website. More particularly, the first musician can be enabled to choose between three qualities each for both audio and video tracks. The three quality options for the video track can include a high quality option (e.g. preset at 2584 kilobits), a medium quality option (e.g. preset at 1536 kilobits), and a low quality option (e.g. preset at 1024 kilobits). Similarly, the three quality options for the audio track can include a high quality option (e.g. preset at 192 kilobits), a medium quality option (e.g. preset at 64 kilobits), and a low quality option (e.g. preset at 32 kilobits). It should be appreciated that the audio and video track quality can be the quality as provided by the third party database, such as YouTube®. Once the respective track is imported, the quality level of the track can be processed to a level to optimize disk space. This process can make it easier to share the track with people who have lower bandwidth and/or slower Internet connections.

Now referring to FIGS. 1 and 2, as the first musician selects the video file, a video progress bar 36 can appear on the user interface 12, which indicates the duration of the output of the video file. For example a diamond-shaped marker 38 is configured to move along the length of the progress bar 36 indicating the progress of the video. Therefore, as the video file is played from start to finish, the marker 38 moves from the start to the end of the progress bar 36.

Figure 5:
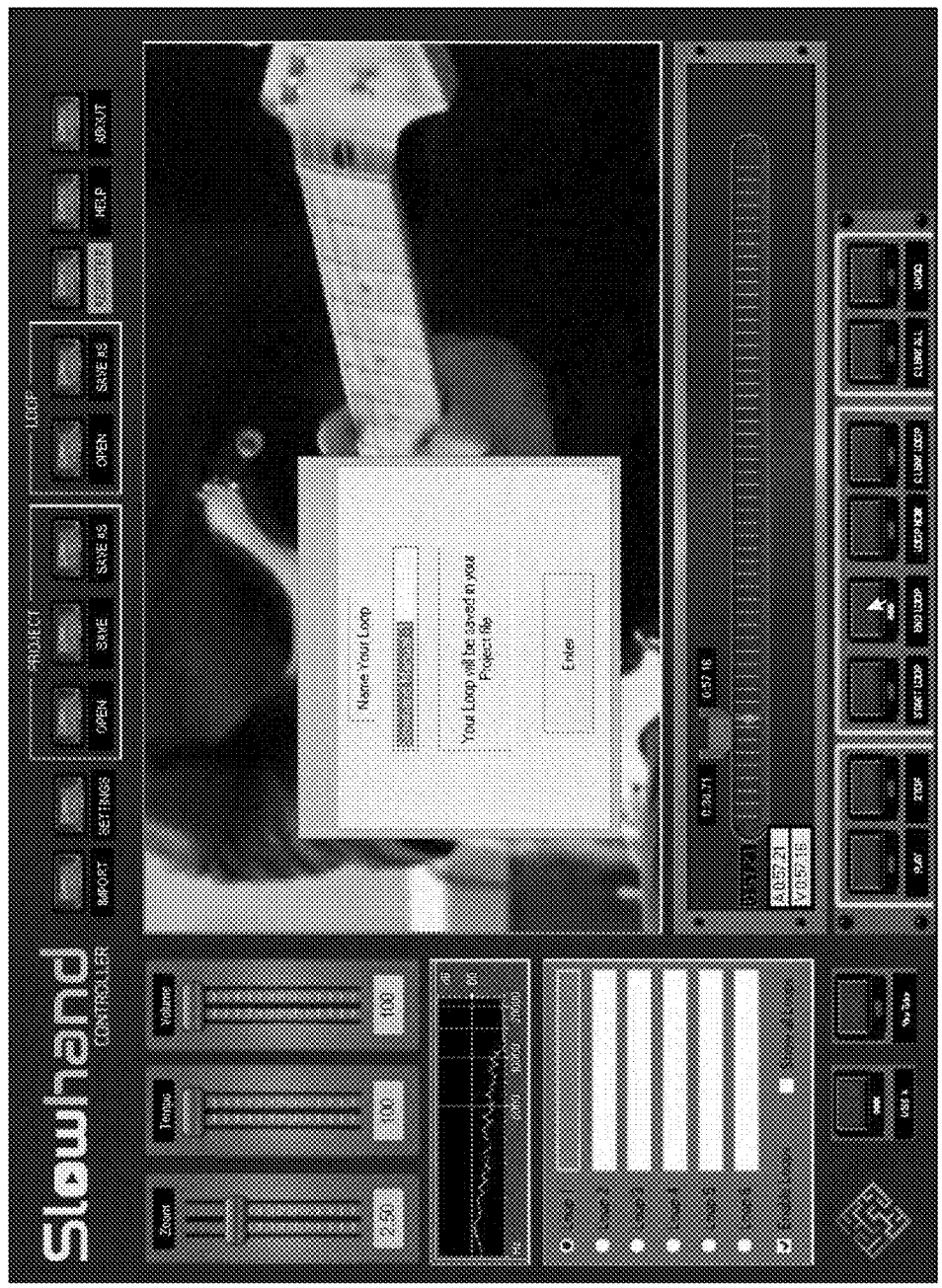
FIG. 5 illustrates a pop-up window prompting a musician to input the name of the loop that is being saved, according to an embodiment of the present invention.

The loop module 18 can include a pair of start and end loop buttons 44 and 46. The first musician can select the start loop button 44 at any point along the length of progress bar 36. The selected starting point, which in this example is represented by a green indicator 40, can register the start point of a loop. Accordingly, the first musician can select the end loop button 46 at any point along the length of the progress bar 36. The selected end point, which here is represented by a red indicator 42, can register the end point of the loop. Once the start and end points of the loop are defined, the first musician, as seen in FIG. 5, may be prompted to name the loop with an identity of his/her choosing or with an identity generated by the system 10 itself. The saved loop can be stored within the local database of the remote computing device 26. As can be appreciated from the Figures, the saved loops can be accessible by selecting the open button 48 under loops.

With continued reference to FIGS. 1 and 2, the loop module 18 can further include a loop now button 50. Selecting the loop now button 50 can enable a currently created loop to continuously play on loop. The loop module 18 can further include a clear loop button 52. Selecting the clear loop button 52 can enable a currently playing loop to be deleted. The loop module 18 can further include a clear all button 54. Selecting the clear all button 54 can enable all currently created loops to be deleted. Even still, the loop module 18 can include an undo button 56. Selecting the undo button 56 can enable all deleted loops to be restored.

Figure 6:
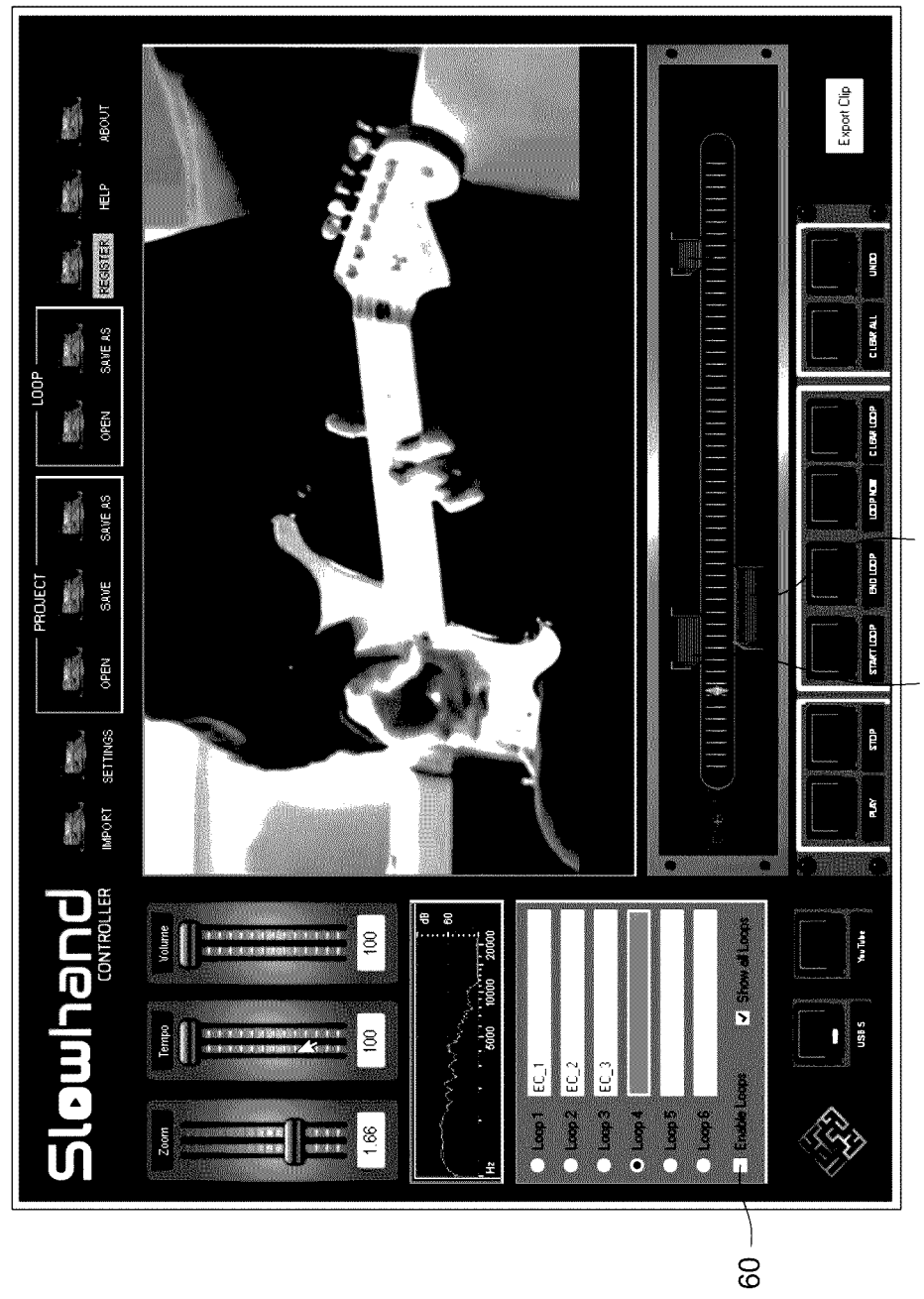
FIG. 6 illustrates a plurality of loops seen in conjunction with a progress bar, according to an embodiment of the present invention.

Referring to FIGS. 1 and 6, the first musician can be enabled to create more than one loop 58 within a currently playing video file. In the event of there being more than one loop 58 for a currently playing video file, the currently playing (or active) loop 58 can be indicated by a specific color, such as a blue color, between start and end points thereof. Accordingly, the rest of the loops 58 (inactive) can be indicated by any other color, such as a green color, between the respective start and end points thereof. When the first musician simply selects an inactive loop 58, the selected inactive loop 58 becomes active, while simultaneously, the active loop 58 becomes inactive. In other words, selecting an inactive loop 58 causes the video to automatically jump to the portion corresponding to the selected loop 58. The loop module 18 can further include an enable loop checkbox 60. Selecting the enable loop checkbox can cause the current loop 58 to play repeatedly.

Now referring to FIGS. 1 and 2, the tempo module 16 can include a pitch module for identifying the pitch of the audio track of the video file. The tempo module 16 can include a tempo slider 62 for increasing and/or decreasing the tempo (or the speed) of the output of video file. While the tempo is adjusted the pitch of the audio track, as identified by the pitch module will remain intact, or in pitch. In some embodiments, the first musician can further be enabled to adjust the pitch, as shown in FIG. 4, by adjusting a pitch control slider 63 upon adjusting the tempo.

The loop module 18 can also include an itemize loop area 65, which can allow the user to name each of the individual loops. In some embodiments, the itemize loop area 65 is a library that stores all various loops from other songs and projects, as created by a user. The user can access the loop library and create custom projects (i.e. lessons or songs) from the various loops within the library. For example, a user could take a first loop (or portion) from an Eric Clapton song and a second loop from a Jimmy Page song and combine them into the same project. This feature can be useful for music teachers and instructors to create unique projects that focus on specific aspects of a lesson plan. In various embodiments, users can upload these projects to any type of cloud storage database, whereby other users can access the projects.

As further illustrated in FIG. 2, the zoom module 20 can include a zoom slider 64, which can be similar to the tempo slider 62. The zoom slider 64 can enable the first musician to zoom into and out of the video output of the video file so as to closely observe the second musician playing an instrument. In some embodiments, the first musician can zoom into an area where the second musician's fingers are playing the strings of a guitar to thereby enable the first musician to more closely observe the finger movements of the second musician on the guitar. Notably, the tempo and the zoom sliders 62 and 64 may be used together whereby, for instance, the first musician while slowing down the video and audio output may zoom into the video output for keen observation, as described above.

Figure 7:
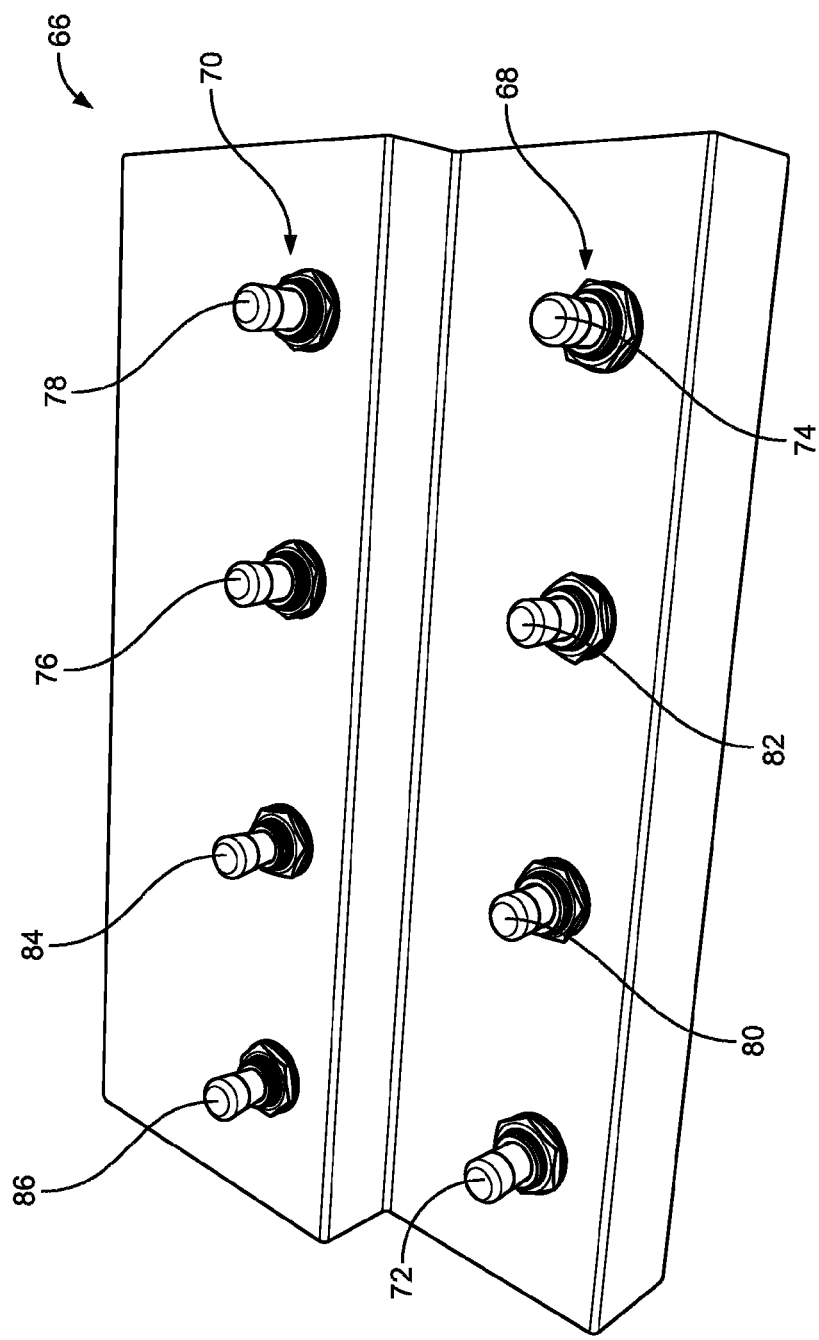
FIG. 7 illustrates a stompbox device, according to an embodiment of the present invention.

Referring to FIG. 7, the system 10 can further include a stompbox device 66, which can be operated by a foot of the first musician. In some embodiments, the stompbox device 66 includes a rectangular stepped structure with a pair of first and second steps 68 and 70, as illustrated in FIG. 7. Each step can include a row of four buttons, each of which can be dedicated to one or two functions depending on how the buttons are pressed. For example, pressing a button briefly may invoke a function while long-pressing a button may invoke a different function. In some embodiments, the first row 68 can include a first button 72, a second button 74, a fifth button 80, and a sixth button 82. As well, the second row 70 can include a third button 76, a fourth button 78, a seventh button 84, and an eighth button 86. More specifically, the fifth and sixth buttons 80 and 82 can both be located between the first and second buttons 72 and 74. As well, the third and seventh buttons 76 and 84 can both be located between the fourth and eighth buttons 78 and 86.

As illustrated in FIG. 7, the first button 72 can include a toggle button. Pressing the first button 72 can result in the remote computing device 26 playing a video file. As well, pressing the first button 72 again can pause the video file from playing. Furthermore, pressing the second button 74 can cause the tempo of the video file to decrease while keeping the pitch of the musical instrument intact. Also, pressing the third button 76 can assign a start loop point and pressing the fourth button 78 can assign an end loop point whereafter, the first musician can be prompted to save the loop as seen earlier in FIG. 5.

The first musician, upon pressing the fifth button 80, while being on a current loop, can move to the next consecutive loop. Pressing the sixth button 82 a first time can zoom into the video. As well, pressing the sixth button 82 a second time can zoom out of the video. Even still, pressing the seventh and eight buttons 84 and 86 can result in the video being fast-forwarded and/or rewinded, respectively.

In some embodiments, the buttons 72, 74, 76, 78, 80, 82, 84, 86 of the stompbox device 66 can be configured to initiate various functions based upon a duration of time in which the respective button is pressed. This can be referred to as tapping, which occurs when the user quickly presses and releases a button, and holding, which occurs when the user presses and holds a button down for a duration longer than 0.5 seconds. For example, the seventh button 84 can be configured to fast-forward the video and/or audio while the seventh button 84 is pressed and held down (i.e. holding). Thus, when the seventh button 84 is released, the video and/or audio can resume normal play. In another example, when the fourth button 80 is tapped, the user can skip to the next loop in the sequence. Conversely, when the fourth button 80 is held down, the user can clear the current loop and move to the next loop in the sequence. These are just a few examples of the various functions that can be performed by the buttons. It should be appreciated that any of the functions described herein can be implemented by any button being tapped or held down.

Figure 8:
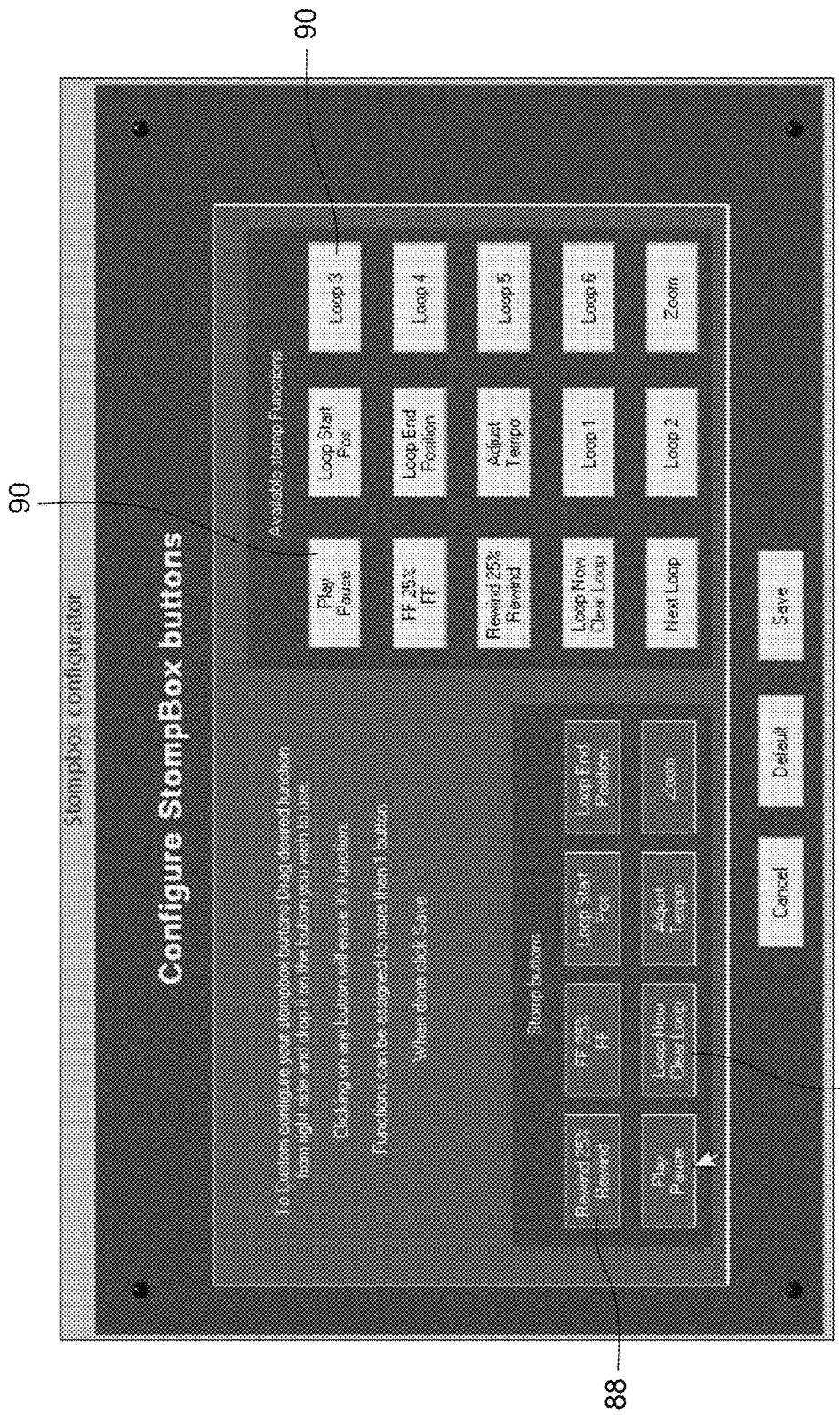
FIG. 8 illustrates a user interface of the stompbox module, according to an embodiment of the present invention.

Referring to FIGS. 1, 7 and 8, the stompbox module can include eight input fields 88. Each input field 88 can represent a button on the stompbox 66, whereby each input field 88 can be adapted to be assigned with a stompbox function 90. Pressing the respective stompbox button can correspond to the input field 88 causing the processor 14 to perform the function 90 assigned to the corresponding input field 88. For example, if the first musician has assigned play/pause function to the input field 88 that corresponds to the seventh button 84, then pressing on the seventh button 84 causes the video to either pause or play. Notably, a function 90 can be assigned to an input field 88 by dragging-and-dropping a function 90 onto the input field 88. Generally, it should be appreciated that the stompbox device 66 can include any number of buttons configured in any fashion. Also, the functions can be assigned to any corresponding button located on the stompbox device 66.

Method Embodiments

Figure 9:
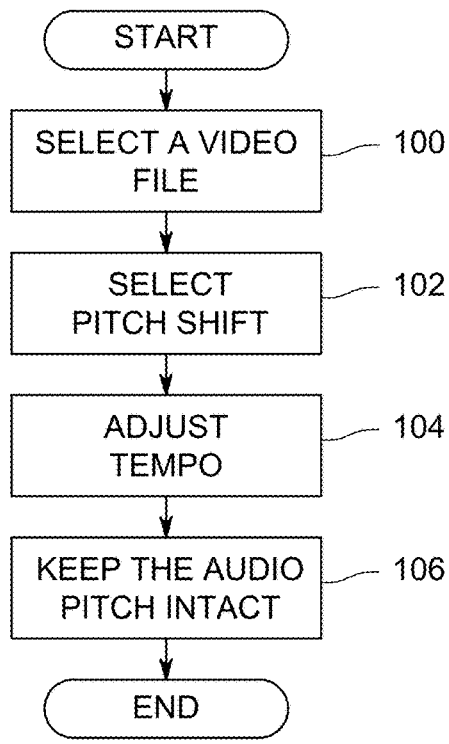
FIG. 9 illustrates a flowchart depicting the process of adjusting the tempo of a video file, according to an embodiment of the present invention.

As shown in FIG. 9, embodiments of the present invention can also be directed to a computer-implemented method for assisting a first musician in learning a musical sequence. Methods can include decreasing the tempo of a synchronized audio-video output of a video file such that, the audio remains in pitch. The methods can initiate with a selecting (at step 100), via a user interface, a video file from a local storage (of a remote computing device) or from a video hosting website such as, YouTube®, Vimeo®, etc. Once the video is selected, the pitch of the audio track of the video file can be selected (at step 102). The method can further include adjusting (at step 104) the tempo slider resulting in the alteration of the tempo of the output of the video file. The pitch of the audio track of the video file can be rendered intact (at step 106) even after the first musician alters the tempo. As well, the method can further include zooming into selected segments of the video so the first musician may be able to more closely observe a particular portion of the video, such as the fingers of the second musician playing the guitar.

Figure 10:
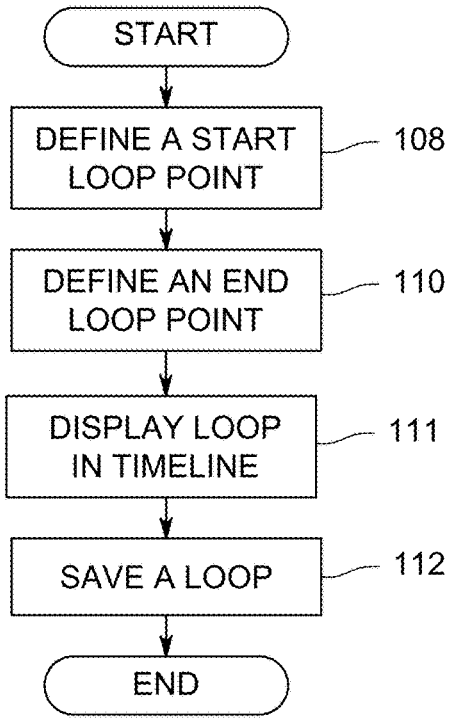
FIG. 10 illustrates a flowchart depicting the process of creating a loop, according to an embodiment of the present invention.

Referring to FIG. 10, the method can further include creating a loop, which can be initiated by assigning a start loop point (step 108) at any point along the length of the progress bar, assigning an end loop point (step 110) at any point along the length of the progress bar. The created loop can thereby be displayed in the timeline (step 111) to indicate to the user where the loop occurs with respect to the rest of the song or project. Additionally, the method can include saving the loop (step 112) defined by the assigned start and end loop points. The method can also include creating multiple loops. Even still, the method can further include enabling the first musician to have the discretion of selecting any one of the loops at any time for practice. Some methods include enabling repeated play of a loop so that the loop plays over and over in a continuous manner. Similar to the method illustrated in FIG. 9, the method shown in FIG. 10 may also include zooming into a portion of the video for keen observation of the second musician.

Embodiments described herein can also be configured such that a user can create loops that have different zoom, tempo, and pan settings. It should be appreciated that pan refers to focusing the video to a different horizontal or vertical location, typically to give a panoramic effect or follow a subject, such as fingers at different locations on an instrument. For example, a user can create a first loop of a first portion of an Eric Clapton song and a second loop of a second portion of the same Eric Clapton song. The user may wish to have different zoom, tempo, and pan settings for the first loop as compared to the second loop. By having different settings amongst loops from the same song, this may allow the user to focus and hone their training with respect to the various loops. Even still, some users may not wish to have different zoom, tempo, and pan settings, so the user may wish to set their settings as global, whereby these settings are the default settings for any and all created loops. For example, a first loop may have 110% zoom, 75% tempo, and panned to a first location, while a second loop has 150% zoom, 60% temp, and panned to a second location. While at the same time the entire video may have 100% zoom, 100% tempo, and be panned on a third location.

The aforementioned embodiments can be implemented, for example, using a machine-readable medium or article which is able to store an instruction or a set of instructions that, if executed by a machine, can cause the machine to perform a method and/or operations described herein. Such machine can include, for example, any suitable processing platform, computing platform, computing device, processing device, electronic device, electronic system, computing system, processing system, computer, processor, or the like, and is able to be implemented using any suitable combination of hardware and/or software. The machine-readable medium or article can include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions can include any suitable type of code, for example, source code, compiled code, interpreted code, executable code, static code, dynamic code, or the like, and is able to be implemented using any suitable high-level, low-level, object-oriented, visual, compiled and/or interpreted programming language, e.g., C, C#, C++, Java, BASIC, Pascal, Fortran, Cobol, assembly language, machine code, or the like. Functions, operations, components and/or features described herein with reference to one or more embodiments, is able to be combined with, or is able to be utilized in combination with, one or more other functions, operations, components and/or features described herein with reference to one or more other embodiments, or vice versa.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

Although the embodiments herein are described with various specific embodiments, it will be obvious for a person skilled in the art to practice the invention with modifications. However, all such modifications are deemed to be within the scope of the claims. While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

Furthermore, the foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The following is claimed:

1. A method of instructing a first musician to play an instrument, comprising:
   importing a video file into a directory of a remote computing device, wherein the video file comprises video of a second musician playing the instrument and audio of the second musician playing the instrument;
   playing the video file with the remote computing device; and
   decreasing a tempo of the video, wherein while the tempo of the video has been decreased, the audio continues to remain in pitch.

2. The method of claim 1, wherein the instrument is one of a stringed instrument, a brass instrument, a reed instrument, a keyboard instrument, and a percussion instrument.

3. The method of claim 1, further comprising increasing the tempo of the video, wherein while the tempo of the video has been increased, the audio continues to remain in pitch.

4. The method of claim 1, further comprising zooming and panning into a selected area of the video, wherein the selected area is the second musician playing the instrument.

5. The method of claim 4, further comprising zooming away from the selected area of the video.

6. The method of claim 1, further comprising:
   creating a first loop of a selected portion of the video and audio; and
   adjusting at least one of a zoom, a pan, and the tempo functions of the first loop.

7. The method of claim 6, further comprising replaying the loop.

8. The method of claim 6, further comprising:
   creating a second loop of a second selected portion of the video and audio; and
   adjusting at least one of the zoom, pan, and tempo functions of the second loop.

9. The method of claim 8, further comprising:
   creating a third loop of a third selected portion of the video and audio;
   creating a fourth loop of a fourth selected portion of the video and audio;
   creating a fifth loop of a fifth selected portion of the video and audio;
   creating a sixth loop of a sixth selected portion of the video and audio; and
   displaying, via a screen of the remote computing device, at least one loop in a timeline that indicates duration of a song.

10. A stompbox system, comprising:
    a remote computing device;
    a stompbox device communicatively coupled to the remote computing device, wherein the stompbox device comprises:
    an outer housing;
    a first button coupled to the outer housing, wherein in response to the first button being pressed, the remote computing device is configured to play a video file comprising video of a musician playing an instrument and audio of the musician playing the instrument; and
    a second button coupled to the outer housing, wherein in response to the second button being pressed, the remote computing device is configured to decrease a tempo of the video such that while the tempo of the video has been decreased, the audio continues to remain in pitch.

11. The system of claim 10, wherein in response to the second button being pressed for a duration of time, the remote computing device is configured to increase the tempo of the video such that while the tempo of the video has been increased, the audio continues to remain in pitch.

12. The system of claim 10, wherein the stompbox device further comprises:
    a third button coupled to the outer housing, wherein in response to the third button being pressed, the remote computing device is configured to start a loop of a selected portion of the video and audio; and
    a fourth button coupled to the outer housing, wherein in response to the fourth button being pressed, the remote computing device is configured to end a loop of the selected portion of the video and audio.

13. The system of claim 12, wherein the stompbox device further comprises a fifth button coupled to the outer housing, wherein in response to the fifth button being pressed for a first duration of time, the remote computing device is configured to move from a first loop to a second loop, and wherein in response to the fifth button being pressed for a second duration of time, the remote computing device is configured to clear the first loop.

14. The system of claim 10, wherein the stompbox device further comprises a sixth button coupled to the outer housing, wherein in response to the sixth button being pressed for a first duration of time, the remote computing device is configured to zoom into a selected area of the video, wherein the selected area is the musician playing the instrument, and wherein in response to the sixth button being pressed for a second duration of time, the remote computing device is configured to zoom away from the selected area of the video.

15. The system of claim 10, wherein the stompbox further comprises:
    a seventh button coupled to the outer housing, wherein in response to the seventh button being pressed, the remote computing device is configured to fast forward the video file; and
    an eighth button coupled to the outer housing, wherein in response to the eighth button being pressed, the remote computing device is configured to fast rewind the video file.

16. A stompbox device, comprising:
    an outer housing;
    a first button coupled to the outer housing, wherein in response to the first button being pressed, a remote computing device is configured to play a video file comprising video of a musician playing an instrument and audio of the musician playing the instrument; and
    a second button coupled to the outer housing, wherein in response to the second button being pressed, the remote computing device is configured to decrease a tempo of the video such that while the tempo of the video has been decreased, the audio continues to remain in pitch.

17. The device of claim 16, further comprising:

a third button coupled to the outer housing, wherein in response to the third button being pressed, the remote computing device is configured to start a loop of a selected portion of the video and audio; and a fourth button coupled to the outer housing, wherein in response to the fourth button being pressed, the remote computing device is configured to end a loop of the selected portion of the video and audio.

18. The device of claim 17, further comprising:

a fifth button coupled to the outer housing, wherein in response to the fifth button being pressed, the remote computing device is configured to move from a first loop to a second loop;

a sixth button coupled to the outer housing, wherein in response to the sixth button being pressed, the remote computing device is configured to zoom into a selected area of the video;

a seventh button coupled to the outer housing, wherein in response to the seventh button being pressed, the remote computing device is configured to fast forward the video file; and an eighth button coupled to the outer housing, wherein in response to the eighth button being pressed, the remote computing device is configured to fast rewind the video file.

19. The device of claim 18, wherein the stompbox defines a first row and a second row, wherein the first row includes the first button, second button, fifth button, and sixth button, and wherein the second row includes the third button, fourth button, seventh button, and eighth button.

20. The device of claim 19, wherein the fifth button and the sixth button are both located between the first button and the second button, and wherein the third button and the seventh button are both located between the fourth button and the eighth button.

\* \* \* \* \*